(No Model.)

T. C. SMITH.
WATER COOLER.

No. 342,397. Patented May 25, 1886.

Witnesses
Joseph B. Lyman
Jos. S. Michael

Inventor
Thos C Smith

UNITED STATES PATENT OFFICE.

THOMAS C. SMITH, OF BROOKLYN, NEW YORK.

WATER-COOLER.

SPECIFICATION forming part of Letters Patent No. 342,397, dated May 25, 1886.

Application filed January 22, 1886. Serial No. 189,376. (No model.)

*To all whom it may concern:*

Be it known that I, THOMAS C. SMITH, a citizen of the United States, and a resident of Green Point, in the city of Brooklyn, county of Kings, and State of New York, have invented a new and useful Improvement in Water-Coolers, of which the following is a specification.

This invention relates to that class of water-coolers which have an ice-chamber separate from the water-reservoir, and has particular reference to a combined filter and water-cooler having such a separate ice-chamber in the reservoir for the filtered water.

The invention consists in a combined filter and water-cooler having a separate ice-chamber suspended within the water-reservoir, below the filter, by a notched flange, and provided with a cover which receives the filtered water as it drips from the filter and conducts it to the periphery of the ice-chamber, so that, passing through the notches in the supporting-flange, it may trickle over the outside of the ice-chamber.

Heretofore a combined filter and water-cooler has been devised having a separate covered ice-chamber below the filter in the water-reservoir; but this chamber simply rested upon the bottom of the water-reservoir. The suspended ice-chamber has, however, certain advantages. It is, for example, held in a central position, so that it is not apt to slip to one side in moving the cooler; it is more accessible; the bottom, as well as the sides, is exposed to the water, and as it (including the supporting-flanges) occupies or may occupy the whole cross-section of the reservoir at the upper part thereof, it may receive all the drippings from the filter, and by conducting them quietly to the bottom the noisy splashing which might otherwise occur is avoided.

Broadly, a suspended ice-chamber is not new in water-coolers; but, so far as I am aware, it was never before used in connection with a filter; nor was it adapted to be so used, for no means were provided for conducting the water into the water-reservoir when the ice-chamber was in place. To fill the cooler the ice-chamber must first be removed.

By having the ice-chamber suspended by a notched flange and provided with a cover it is evident that the water-reservoir could be filled by pouring in water as well as by dripping from a filter. These features are therefore useful in water-coolers which have no filter, and this application of them is included in the invention.

Figure 2:
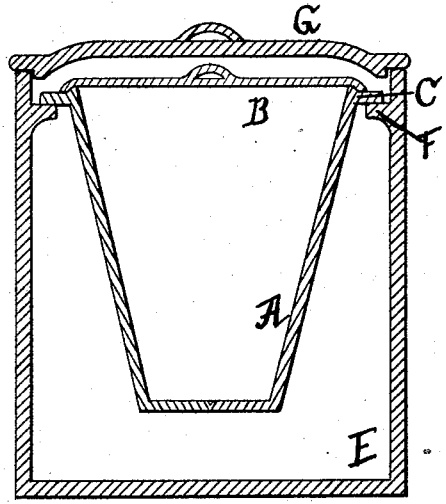
Figure 1:
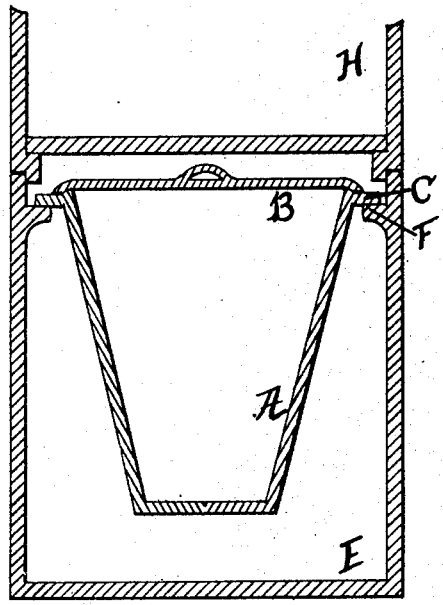
Figure 3:
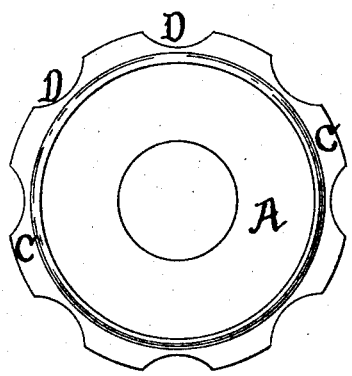

In the accompanying drawings, which make part of this specification, Figure 1 is a vertical section of a combined filter and water-cooler constructed in accordance with the invention, the upper part of the filter-chamber being removed; Fig. 2, a similar view of an ordinary cooler, also constructed in accordance with the invention or with part thereof; and Fig. 3, a plan of the ice-chamber.

A is the ice-chamber, having the external notched supporting-flange, C, and provided with a cover, B. It is supported in the water-reservoir E by the internal flange, F, upon which the notched flange rests. Where the ice-chamber is thus suspended, the notches in the flange C form openings by which the water shed from the cover B can flow past the flanges, and if the flow is small, as from a filter, it can trickle over the sides of the ice-chamber.

H is the filter, supported upon the water-reservoir. In Fig. 2 the water-reservoir has a cover, G.

Any suitable material can be used for the ice-chamber, water-reservoir, and filter-chamber; but porcelain or vitrified stoneware is preferred.

The improved water-coolers or combined filters and water-coolers can be made of any suitable size or form.

I claim—

1. The combined filter and water-cooler, comprising, in connection with a water-reservoir and a filter supported thereon, a separate ice-chamber suspended within the water-reservoir, below the filter, by a notched flange, and provided with a cover to shed the drippings from the filter, so that they may pass through the notches in the flange and trickle down the outside of the ice-chamber, substantially as described.

2. In combination with a water-reservoir, a separate ice-chamber suspended within said reservoir by a notched flange, and provided with a cover, substantially as described.

In testimony that I claim the foregoing as my invention I have signed my name, in presence of two witnesses, this 21st day of January, 1886.

THOS. C. SMITH.

Witnesses:
JOSEPH B. LYMAN,
JOS. S. MICHAEL.